018 # United States Patent

[11] 3,617,300

| [72] | Inventors | Eugene H. Borochoff<br>Saint Louis Park;<br>Theodore W. Craig, Minneapolis; Herbert<br>N. Dunning, Minnetonka, all of Minn. |
|---|---|---|
| [21] | Appl. No. | 694,113 |
| [22] | Filed | Dec. 28, 1967 |
| [45] | Patented | Nov. 2, 1971 |
| [73] | Assignee | General Mills, Inc. |

[54] IN SITU CONVERSION OF STARCH
3 Claims, No Drawings

[52] U.S. Cl. .................................................. 99/9,
99/2, 99/83
[51] Int. Cl. ..................................................... A23k 1/00
[50] Field of Search ........................................ 99/2, 2 OE,
2 UM, 9, 83, 90; 195/31

[56] References Cited
UNITED STATES PATENTS

| 1,018,415 | 2/1912 | Ellis | 99/2 |
| 3,202,514 | 8/1965 | Burgess | 99/2 |
| 3,249,512 | 5/1966 | Bode | 195/31 |
| 3,337,414 | 8/1967 | Wilson | 195/31 |
| 3,489,574 | 1/1970 | DuPuis | 99/2 |

Primary Examiner—Lionel M. Shapiro
Assistant Examiner—Robert M. Elliott
Attorneys—Anthony A. Juettner and William C. Babcock ABSTRACT: A process for the enzymatic conversion of starch to glucose in a pet food comprising the addition of alpha-amylase and amyloglucosidase to a solid amylaceous system.

IN SITU CONVERSION OF STARCH

SPECIFICATION

The process of our invention is comprised of the simultaneous conversion of starch to dextrose enzymatically in a solid amylaceous system. This is done by contacting a solid amylaceous system with alpha-amylase and amyloglucosidase.

We have found, much to our surprise, that we are able to bring about an enzymatic conversion of starch to glucose in a solid anylaceous system. By a solid amylaceous system we mean a system in which the amylaceous material is not part of a fluid system, at any time during conversion. An example of a fluid system would be a solution of diluted corn syrup or corn starch particles slurried or suspended in water. A solid amylaceous system, by contrast, is one in which the amylaceous material has moisture present only within the solid piece or has slight amounts of moisture which may be present on the surface.

The two enzymes used in this process are alpha-amylase and amyloglusidase. The alpha-amylase randomly attacks the alpha 1-4 bonds in a starch or dextrin molecule resulting in the fragmentation of both linear and branched fragments of starch, i.e. dextrinization. If sufficient time is allotted, under certain conditions, alpha-amylase, alone, can be made to convert linear glucose chains mostly to a mixture of maltose and dextrose, and branched chains to a mixture of maltose, dextrose and panose, the latter being a trisaccharide containing an alpha 1-6 linkage. Alpha amylase is known as a liquefying enzyme because as commonly used for dextrose conversion, it converts a starch slurry to dextrins, thereby thinning it out considerably.

The second enzyme used in the process of our invention is an amyloglucosidase. The amyloglucosidase works directly from the nonreducing ends of starch chains, but splits off single glucose units. It acts on alpha-1-4 linkages and alpha 1-6 linkages. The rate of reaction being about 20 times faster on the former than on the latter.

There are several advantages to the process of our invention. For example, a solid pet food product sweetened by dextrose may be produced on a continuous process by starting with the cheaper and more easily handled raw starch (of course gelatinized starch may also be used). The pet food produced by this process has high acceptance from dogs, from a palatability standpoint.

While processes for the conversion of starch to dextrose by the sequential addition of alpha-amylase and amyloglucosidase or an acid in a fluid system are old, to the best of our knowledge there is no successful process for the production of dextrose in a food product which is essentially a solid system. We have found that, by the process of our invention, i.e. the contacting of the solid amylaceous material by alpha-amylase and amyloglucosidase we are able to convert the solid amylaceous material while retaining the solid nature of the system.

Contacting of the amylaceous system with the enzyme may be done either sequentially or essentially simultaneously, although the essentially simultaneous addition is greatly preferred. If a sequential enzymatic addition is used, the alpha-amylase tends to reduce the ability of the amylaceous system to bind water, and if the system contains high levels of moisture, a drying step may be needed before the amyloglucosidase is added to enable the piece to retain its desired solid form. This is especially true if the amyloglucosidase is suspended in water prior to its addition, although the enzyme may be mixed thoroughly in a dry state with the product.

If, on the other hand, the enzymes are added essentially simultaneously, i.e. amyloglucosidase is added before a large amount of the starch is degraded by the alpha-amylase, then there is no need for the more involved procedure which may be necessary to enable the amylaceous material to retain its solid form. We most prefer to add the enzymes at the same time, for obvious reasons.

Many pet foods are currently on the market which are sweetened and grain based. By sweetened, grain based pet foods we mean pet foods containing a high percentage of amylaceous material derived from a grain or grain produce such as flour or starch, some sugar and added proteinaceous material. By proteinaceous material we mean such things as vegetable protein such as soy meal; animal protein such as meat from animals such as veal, pork, beef, lamb; and we also mean fish, flesh and meat byproducts such as lungs and spleen. The cereal based pet food products comprised of proteinaceous material often have some sweetener present to enhance palatability for the animal. In this regard, dextrose is often used. While dextrose is a lower level sweetener than sucrose, it is generally relatively inexpensive and there is some evidence that pets may actually prefer dextrose from a palatability standpoint. The addition of any sugar in a standard pet food operation is a difficult and costly one. The handling of sugar along with the other ingredients is messy and difficult and is therefore desirable to avoid.

The process of our invention enables the manufacturer to avoid the direct handling of sugar in combination with the other materials normally used in pet food manufacture.

The preferred embodiment of the process of our invention is comprised of contacting a solid amylaceous system essentially simultaneously with an alpha amylase and an amyloglucosidase. We prefer to add the alpha amylase and the amyloglucosidase at the same time. However, of course, the amyloglucosidase may be added before there is substantial dextrinization by the alpha amylase. The reason this is not desired is because it makes an additional step in the process and makes the designing of a continuous process involving the enzymatic conversion mentioned above more difficult.

Contacting may be done by a variety of means. The enzymes in their powdered form or in a liquid form may be mixed with a dough if the product itself is in dough form. The enzymes may be dissolved or suspended in a small amount of water and this may be sprayed or coated by means common to the art on the surface of the solid amylaceous material. If the latter method is employed, the minimum amount of water needed is used so that the system is still solid and no slurry or suspension is formed.

In order to accomplish the desired enzyme conversion the temperature after the enzyme has been included should not exceed the inactivation temperature of the enzyme, between about 80 and 90° C. However, by elevating the temperature beyond that point after the desired amount of dextrose has been produced, an excellent method for controlling the amount of conversion is at the disposal of the practitioner of the teachings of our invention. It is also possible to add the enzymes after whatever heat treatment normally used in the processing of a particular food product is concluded, thereby allowing the conversion to dextrose to occur during storage.

Other factors which influence the effect of the process of our invention and more specifically the rate of enzymatic conversion are the concentration of the enzyme, the moisture level of the solid amylaceous system, and the time as related to the temperature during conversion. In general, the higher the temperature up to the inactivation temperature, the faster the conversion and, of course, the longer the time that the enzyme is allowed to act, the higher the level of conversion in the final product. The particular choice of time and temperature may be based on the compatibility of these conditions with the processing conditions used in the normal manufacture of the particular product.

The concentration of enzymes will also effect the amount and rate of conversion. We prefer to keep the levels of each enzyme approximately equal to each other. We have found in general that, for most uses, we need an enzyme concentration greater than about 0.01 percent by weight of starch and we most prefer to use an enzyme concentration level above 0.1 percent. Enzyme concentration levels of about 0.1 to about 0.5 percent by weight of starch in the product produce satisfactory conversion for the types of product we desire. Of course, higher levels of enzyme concentration may be used for other products and may indeed be desirable for some of them, but we prefer to manipulate time and temperature relationships to get the amount of conversion desired.

We have found that a solid amylaceous system converted by the process of our invention seems to be affected by moisture in an unexpected manner. We have found that we need water at a level of about 25 percent by weight of the product as a whole to obtain a reaction. We also find a maximum conversion figure near about 40 percent moisture.

The process of our invention is effective over a relatively large pH range. The maximum conversion takes place near neutrality; however, we get substantial levels of conversion all the way down to about a pH of 3 and possibly below. A substantially alkaline system may inhibit the action of the enzymes. However, it would seem that almost any high acid food product containing a solid amylaceous system may be converted by the teachings of our invention.

For certain uses, for example in the manufacture of a pet food based on an amylaceous product, enzymes which are essentially protease and lipase free may be desirable. These are now commercially available.

Examples of the process of our invention follow. The examples are illustrative of the variables involved in accomplishing the process of our invention and their interrelationship.

EXAMPLE I

The corn used in examples I–III was corn grits containing 75 percent starch. The wheat used in examples I–III was partially dehulled and contained 66.7 percent starch.

Example I is designed to show the effect of time and enzyme concentration on the level of conversion.

A solid cohesive mass consisting of the grain containing 40 percent moisture, and an amylase and an amyloglucosidase was formed by adding enzymes and water to the finely ground grain to make doughs. Then temperatures sufficient to inactivate the enzymes were applied to the doughs. (The time referred to below is the time between enzyme addition and toasting). Five lots were made in this manner, three of corn, two of wheat. The results are shown in Table I.

TABLE I

| Lot No. | Grain | Enzyme level,* percent | Temperature, ° C. | Time, hrs. | Total sugar | Reducing sugar percent by wt. of final product |
| --- | --- | --- | --- | --- | --- | --- |
| 1 | Corn | 0.5 | 60 | 4 | 49.0 | 33.0 |
| 2 | do | 0.25 | 60 | 18 | 51.4 | 50.0 |
| 3 | do | 0 | 60 | 16 | 3.1 | 2.7 |
| 4 | Wheat | 0.5 | 60 | 4 | 56.3 | 25.0 |
| 5 | do | 0 | 60 | 4 | 8.8 | 1.1 |

*The level of each enzyme is expressed by weight of the grain.

Reducing sugars as listed in the table above provide a fairly accurate measure of the level of dextrose. The percent of dextrose present in the reducing sugar figure above varies between about 70 to about 90 percent as determined by paper chromatographic studies.

EXAMPLE II

This example is designed to show the effect of moisture on enzymatic conversion in a solid amylaceous system.

Corn grits were used in this example. They were puffed in a continuous puffing gun to gelatinize the starch. The puffed grits were then finely ground. 0.25 percent by weight of the grain each of amylase and amyloglucosidase were added along with the varying amounts of water indicated below, and five separate cohesive solid masses were formed, each with a different moisture level. They were then held at 60° C. for 4 hours. Subsequent analysis yielded the data set forth in Table II.

Table II

| % H₂O | % Reducing Sugar by wt. of Final Product | % Total Sugar by wt. of Final Product |
| --- | --- | --- |
| 20 | | |
| 25 | 1.0 | 1.4 |
| 33 | 2.4 | 4.4 |
| 40 | 25.9 | 26.7 |
| 60 | 36.0 | 49.0 |
| | 35.5 | 37.2 |

(At the 60% moisture level the mass starts to lose its cohesive character)

EXAMPLE III

The corn grits were prepared and held as in example II except that the moisture level was held constant at 40 percent, the enzyme concentration was reduced to 0.12 percent for each enzyme and the mass was divided into lots and buffered to achieve various pH levels as indicated below. Total sugar measurements were taken after the holding period was ended, with results as indicated in table III below.

TABLE III

| Lot 0 | pH | Total Sugar % by wt. of Final Product |
| --- | --- | --- |
| 1 | 3.4 | 20.6 |
| 2 | 4.3 | 38.5 |
| 3 | 5.8 | 39.5 |
| 4 | 7.0 | 43.6 |

EXAMPLE IV

A typical grain based pet food was made using the ingredients listed below.

| Ingredient | % by wt.* |
| --- | --- |
| Soy bean meal (solvent extracted) | 19.34 |
| Flour (about 70% starch) | 40.87 |
| Bone meal (steamed) | 3.18 |
| Whey | 1.82 |
| Propylene glycol | 3.18 |
| Soy bean oil (crude, degummed) | 1.18 |
| NaCl | 0.63 |
| Vitamin and mineral mix | 0.69 |
| Red color | 0.02 |
| Beef tallow mixed with formula | 2.86 |
| Beef tallow added to surface | 3.36 |
| Meat by-products (dehydrated) | 2.07 |
| Water | 20.84 |
| Alpha-amylase | 0.1 |
| Amyloglucosidase | 0.1 |

(*these numbers are rounded off to the nearest 0.01)

With the exception of the meat by-products, surface tallow, water and enzymes, the ingredients were mixed together in a ribbon blender. Water and enzymes were blended with the mixture and the mixture was then formed. The formed mass was cut and enrobed with tallow and dehydrate d meat by-products.

The product was split into two lots and held at room temperature. The first lot was held for 3 days and the second for 6.

After holding total sugar was measured with the following results.

| Fat | Total Sugar by wt. of Final Product |
|---|---|
| 3 days hold | 7.95 |
| 6 days hold | 12.0 |

These examples are merely illustrative of our invention and should not be construed as limiting either to the scope or spirit of the teachings herein.

Having fully and completely disclosed the process of our invention we hereby claim:

1. A process for the production of an edible sweetened, grain based pet food product containing substantial amounts of enzymatically produced glucose and added protein, said process comprised of essentially simultaneously contacting a solid composition of amylaceous material containing added protein and containing 25–40 percent water with an alpha-amylase and an amyloglucosidase while retaining the solid nature of the system throughout the conversion of said amylaceous material.

2. The process of claim 1 where the amylaceous material is contacted with the enzymes after the amylaceous material has undergone elevated temperature processing normal to its manufacture.

3. The process of claim 1 where the amylaceous material is contacted with the enzymes and subsequently subjected to a heat treatment sufficient to inactivate the enzymes after glucose has been found at levels approximately adequate to provide the level of sweetness normal to a pet food.

PO-1050
(5/69)

UNITED STATES PATENT OFFICE
CERTIFICATE OF CORRECTION

Patent No. 3,617,300                    Dated November 2, 1971

Inventor(s) Eugene H. Borochoff, Theodore W. Craig and Herbert N. Dunning

It is certified that error appears in the above-identified patent and that said Letters Patent are hereby corrected as shown below:

Column 1, line 10, "anylaceous" should read -- amylaceous --.
Column 2, line 4, "produce" should read -- product --. Column 4, Table II should have three columns, the first two columns of which should read as follows:

| % $H_2O$ | % Reducing Sugar by wt. of Final Product |
|---|---|
| 20 | 1.0 |
| 25 | 2.4 |
| 33 | 25.9 |
| 40 | 36.0 |
| 60 | 35.5 |

Column 4, line 35, "Lot O" should read -- Lot # --. Column 6, line 15, "found" should read -- formed --.

Signed and sealed this 2nd day of May 1972.

(SEAL)
Attest:

EDWARD M. FLETCHER, JR.
Attesting Officer

ROBERT GOTTSCHALK
Commissioner of Patents